April 23, 1957 A. ARRIGHINI ET AL 2,789,337
INSIDE CORNER STRUCTURE FOR PREFABRICATED
FORMS FOR COMPOSITION WALLS
Filed July 2, 1953 3 Sheets-Sheet 3

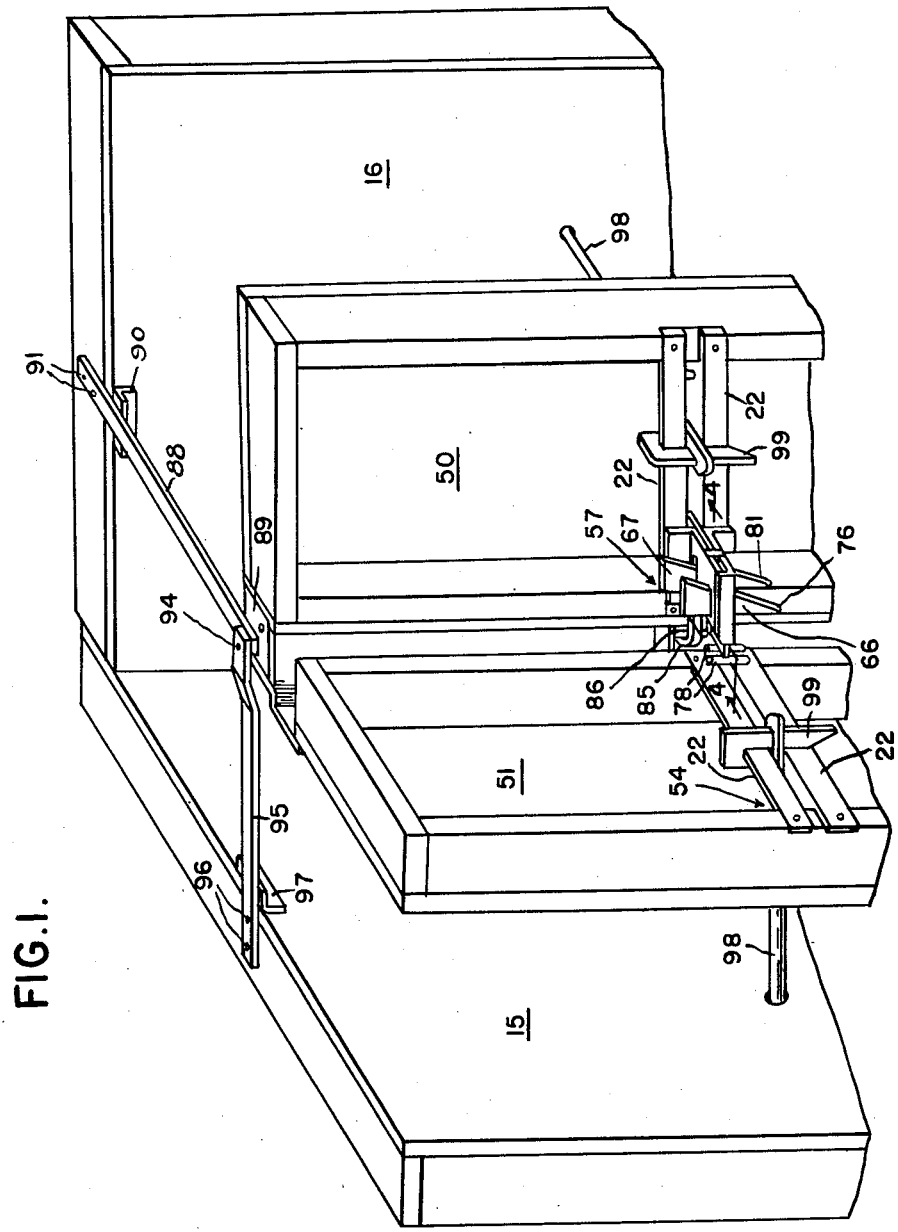

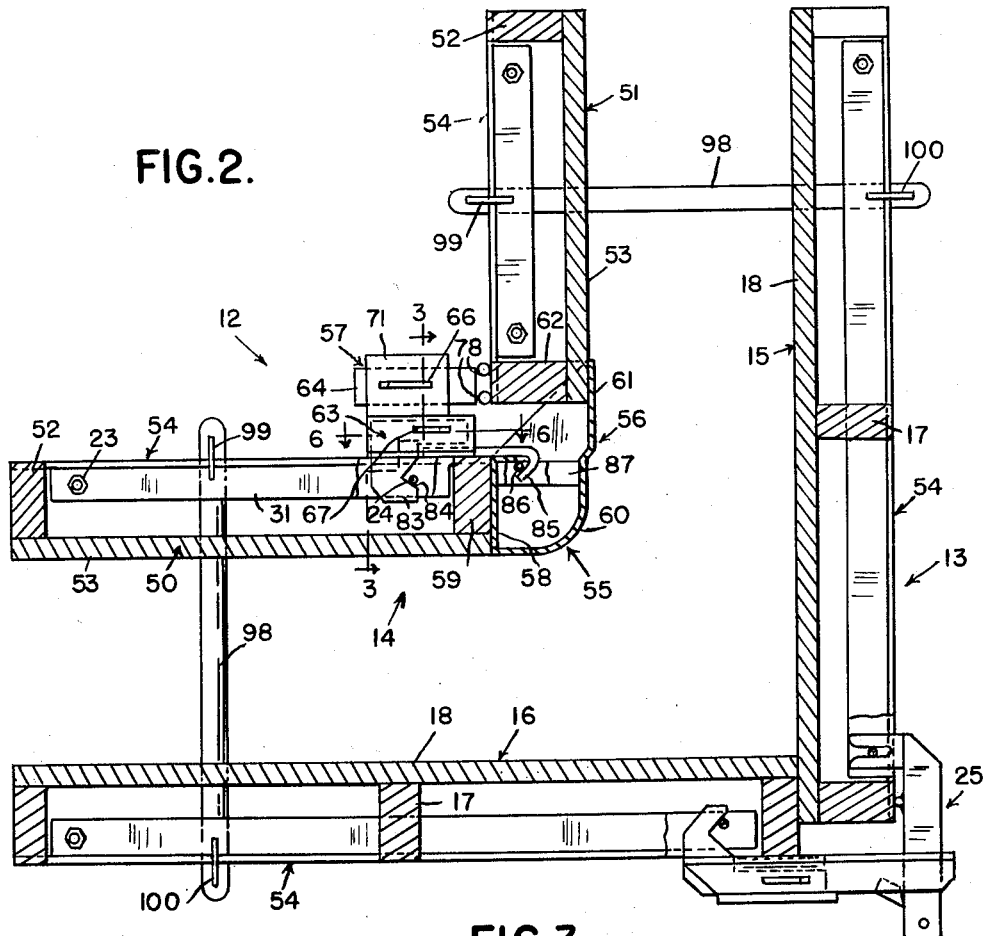
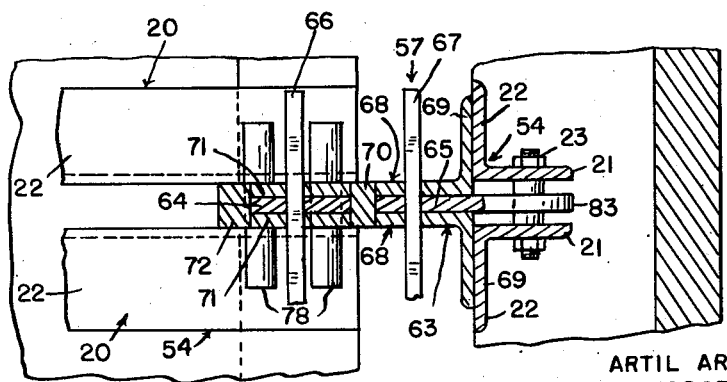

INVENTORS
ARTIL ARRIGHINI
GEORGE A. VAN SICKLE
BY
*Whittemore, Hulbert & Belknap*
ATTORNEYS United States Patent Office 2,789,337
Patented Apr. 23, 1957

2,789,337

INSIDE CORNER STRUCTURE FOR PREFABRICATED FORMS FOR COMPOSITION WALLS

Artil Arrighini, Detroit, and George A. Van Sickle, Mount Clemens, Mich., assignors, by mesne assignments, to Rocwall Company, Detroit, Mich., a corporation of Michigan Application July 2, 1953, Serial No. 366,044

6 Claims. (Cl. 25—131)

This invention relates to forms for composition walls and refers more particularly to improvements in the structure provided to form the corners of a composition wall and especially the inside corners thereof.

It is an object of this invention to provide the form with an inside corner structure rendering it possible to form a composition wall with a smooth inner surface at the corner and composed of a relatively few simple parts capable of being readily assembled and disassembled.

It is another object of this invention to provide an inside corner structure having a corner filler between the end edges of adjacent angularly related corner panels and having readily operable clamps for removably securing the filler and corner panels in assembled relationship.

The foregoing as well as other objects will be made more apparent as this description proceeds especially when considered in connection with the accompanying drawings, wherein:

Figure 1 is a fragmentary perspective view of a corner of a prefabricated form for composition walls and illustrating the clamp incorporated for removably securing the inner wall panels together at the inside corner of the form;

Figure 2 is a fragmentary cross sectional view through the prefabricated wall form at the corner shown in Fig. 1;

Figure 3 is a sectional view taken on the line 3—3 of Figure 2;

Figure 5:
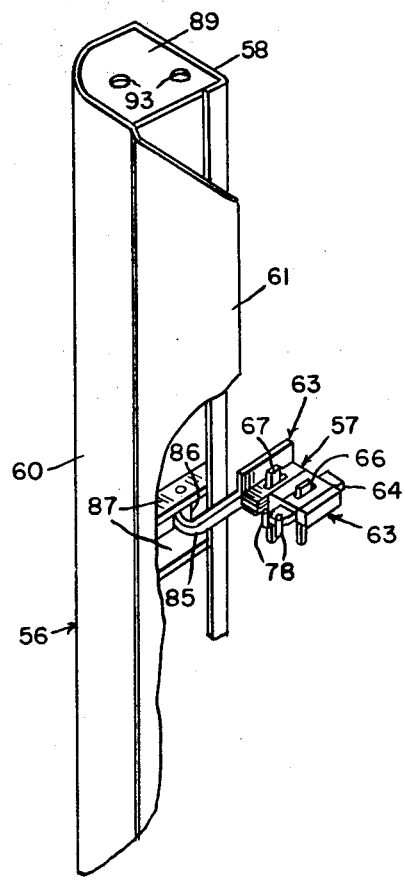
Figure 5 is a fragmentary perspective view of a filler used in connection with the inside corner of a prefabricated wall and showing an inside clamp in position relative to the filler.

In Figures 1–2 inclusive, the numeral 12 designates one corner of a prefabricated form used for the purpose of forming walls of composition material capable of being poured, such for example as concrete. The corner 12 comprises an outside corner section 13 and an inside corner section 14. The outside corner section 13 comprises panels 15 and 16 extending at right angles to one another. As shown in the drawings, the panels 15 and 16 are formed of wood, although it will be understood that these panels may be formed of any material possessing the required rigidity. In detail, each panel comprises a frame 17 and a sheet 18 of plywood suitably secured to the inner side of the frame 17 in order to provide a smooth and uninterrupted surface. These panels 15 and 16 are connected together by a corner clamp generally indicated at 25.

The inner surface of the composition wall is formed by panels 50 and 51. These panels are respectively spaced laterally from and extend parallel to the outer panels 15 and 16. The inner panels 50 and 51 are identical in construction. Each inner panel comprises a frame 52, a sheet 53 suitably secured to the outer side of the frame in a manner to form the inner surface of the composition wall, and a waler 54 suitably secured to the inner side of the frame 52. The walers 54 extend in the direction of length of the panel and have laterally spaced angle members 20. The angle members 20 are arranged with the horizontal flanges 21 positioned adjacent one another and projecting inwardly with respect to the associated panel. More particularly, the vertical flanges 22 of the angle members 20 project laterally outwardly from the horizontal flanges 21 and lie in a common vertical plane. The flanges 21 are secured together at longitudinally spaced points by fastener elements 23 in the form of studs and the flanges 21 are held in proper spaced relationship by spacers 24 which may be formed integral with the studs 23 or may be in the form of sleeves respectively mounted on the studs 23 between the horizontal flanges 21. In any case, the frame members of the frame 52 are slotted to receive the walers 54 in a manner such that the outer surfaces of the vertical flanges 22 on the angle members 20 lie flush with the outer surface of the frame 52. The walers are secured to the respective frames 52 of the panels by screws or other fastener elements and in actual practice each panel has two or more walers secured thereto at spaced intervals vertically of the panels.

As shown in Figure 2 of the drawings, the adjacent ends of the corner panels 50 and 51 are spaced from each other and are connected by a corner structure indicated generally by the reference numeral 55. The corner structure 55 comprises a filler 56 and inside corner clamps, one of which is indicated by the numeral 57. As shown particularly in Figure 5 of the drawings, the filler 56 comprises a vertical sheet metal column having an inner wall 58 adapted to abut the outer end 59 of the panel 50 and having an outer wall 60 which is transversely curved in a manner to form the composition wall with a rounded inner corner. The outer wall 60 terminates in a flange 61 which overlies the inner surface of the panel 51 adjacent the outer end 62 of the panel 51. As will be more fully hereinafter described, the filler 55 is clamped to the end 59 of the panel 50 and the end portion 62 of the panel 51 is clamped to the flange 61 by the inside corner clamp 57.

Figure 6:
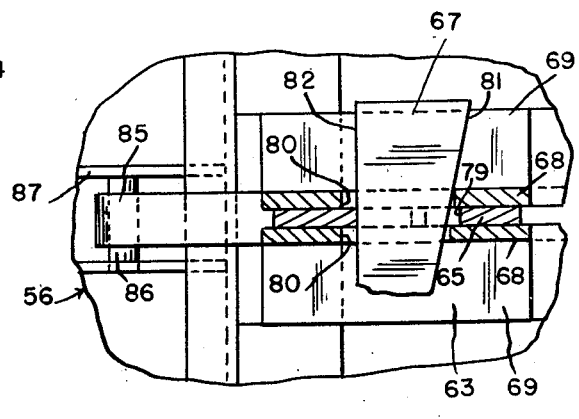
Figure 6 is a sectional view taken on the line 6—6 of Figure 2.

The inside corner clamp 57 comprises a supporting part 63, a pair of parts 64 and 65 slidably mounted on the supporting part 63, and a pair of wedges 66 and 67. In Figures 2, 3 and 6, the supporting part 63 comprises angle members 68 having the horizontal flanges spaced vertically from one another and having the vertical flanges 69 extending in opposite directions in a common vertical plane. Welded or otherwise suitably secured to the free edges of the horizontal flanges is a bar 70 which bridges the vertical space between the horizontal flanges and cooperates with the latter to form a guide for the part 65. A pair of vertically spaced plates 71 are welded along one longitudinal edge thereof to the bar 70 and the opposite longitudinal edges of the plates 71 are welded to a bar 72. The bar 72 bridges the vertical space between the plates 71 and cooperates with the latter and with the bar 70 to form a guide for the part 64. The construction is such that the parts 64 and 65 are mounted on the supporting part 63 for sliding movement along parallel paths.

Figure 4:
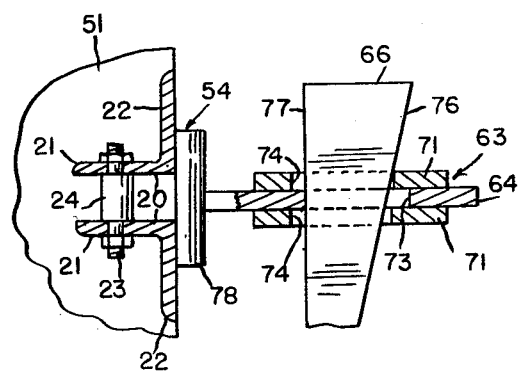
Figure 4 is a sectional view taken on the line 4—4 of Figure 1.

As shown in Figure 4 of the drawings, the part 64 has a slot 73 elongated in the direction of sliding movement of the part 64 and registrable with elongated slots 74 formed in the plates 71. The wedge 66 projects downwardly through the slots 73 and 74. The outer edge 76 of the vertical wedge 66 is tapered from the upper end of the wedge to the lower end and has a camming engagement with the adjacent edge of the slot 74 in the uppermost plate 71. The opposite edge 77 of the wedge extends in a straight line substantially perpendicular to the part 64 and has a bearing engagement with the adjacent edge of the slot 73 in the part 64. The arrangement is such that downward movement of the wedge 66 imparts a movement to the part 64 in the direction of the panel 51. It wil be noted from Figures 3 and 4 of the drawings that a pair of vertically extending abutment rods 78 are secured to the inner end of the part 64 in lateral spaced relationship and the arrangement is such that these rods abut the adjacent waler 54 on the panel 51, as will be more fully hereinafter described.

As shown in Figure 6 of the drawings, the part 65 has an elongated slot 79 extending in the direction of sliding movement of the part 65 and registrable with elongated slots 80 formed in the horizontal flanges of the angle members 68. The wedge 67 extends downwardly through the slots 79 and 80. One edge 81 of the wedge 67 tapers downwardly from the upper end of the wedge and has a cam engagement with the adjacent edge of the slot 80 formed in the horizontal flange of the uppermost member 68, and the opposite edge 82 of the wedge extends normal to the part 65 and engages the adjacent edge of the slot 79 in the part 65. With the above arrangement, downward movement of the wedge imparts a sliding movement to the part 65 in a direction toward the panel 51.

As shown in Figure 2 of the drawings, an anchor member 83 extends laterally outwardly from the part 65 and is formed with a V-shaped slot 84 which opens toward a hook 85 at the outer end of the supporting part 63. It will be noted from Figure 5 of the drawings that the hook 85 is in the form of a bar permanently welded or otherwise secured to the supporting part 63.

In use, the clamp 57 is assembled in the manner shown in Figure 2 of the drawings wherein it will be noted that the anchor member 83 is extended between the horizontal flanges 21 of the adjacent waler 54 in a position to engage the spacer 24 associated with the end fastener 23 of the waler 54. More particularly, the spacer 24 is received in the slot 84 and has a camming engagement with the outer tapered edge of the slot 84 so that movement of the part 65 in a direction toward the end 59 of the panel 54 firmly clamps the supporting part 63 against the vertical flanges 22 of the adjacent waler 54. The hook 85 projects into the filler column 56 and is engageable with a vertical pin 86 secured to the filler column 56 by frame members 87. It follows from the above that downward movement of the wedge 67 in effect relatively moves the anchor member 83 and the hook 85 in directions toward one another to effectively clamp the end wall 58 of the filler column 56 to the adjacent end wall 59 of the panel 50.

It will further be noted from Figure 2 of the drawings that when the clamp 57 is installed the abutment bars 78 engage the adjacent waler 54 on the panel 51 at the end 62 of the latter. As a result, downward movement of the wedge 66 effectively clamps the panel 51 against the flange part on the filler column 56. Thus, the corner panels 50 and 51 together with the filler column 56 are firmly and removably clamped together by the clamp 57.

It will be noted from Figure 1 of the drawings that the panel 16 is held in proper spaced relationship to the panel 50 by a spacer 88 comprising an elongated bar having the outer end overlying the top of the panel 16 and having the inner end overlying the top wall 89 of the filler column 56. A stop in the form of an angle member 90 is secured to the underside of the bar 88 in a position to abut the inner surface of the panel 16 and fastener elements 91 are provided for securing the outer end of the bar 88 to the panel 16. The inner end of the bar 88 is formed with an opening which is selectively registrable with laterally spaced openings 93 formed in the top wall 89 of the filler column 56 (see Fig. 5), depending on the desired width of the composition wall to be formed between the panels.

The inner end of the bar 88 is held in position by a pin 94 extending through the opening in the bar 88 and through one of the openings 93. The pin 94 is secured at its upper end to the inner end of a second bar 95 having the outer end overlying the top of the panel 15 and secured thereto by fastener elements 96. An abutment 97 in the form of an angle member is welded or otherwise suitably secured to the underside of the bar 95 in a position to engage the inner surface of the panel 15.

In practice, the inner and outer panels are also secured in lateral spaced relationship by tie rods 98. As shown in Figures 1 and 2 of the drawings, the inner ends of the tie rods 98 project between the angle members of the walers 54 and the outer ends project between the angle members of the walers 54 on the outer panels which are identical in construction to the walers 54 on the inner panels. The inner ends of the rods 98 have slots therethrough for receiving pins 99 and the upper ends of the pins are shaped to hook over the vertical flanges 22 of the top angle members of the walers 54 on the inner panels. The outer ends of the tie rods 98 are also provided with slots for receiving pins 100 having hooked portions at the top adapted to hook over the vertical flanges 22 of the top angle members of the walers on the outer panels. The rods 98 are tapered from one end to the other in order to facilitate withdrawing the rods subsequent to pouring the composition material between the walls of the form.

It follows from the foregoing that the present invention provides an inside corner clamp rendering it possible to readily and effectively secure the inside corner panels of a composition wall in place. It will also be noted that the inside corner clamp is composed of a relatively few simple parts which are asembled to provide a unitary structure and this feature contributes materially to facilitating both installation and removal of the clamp.

This application is a continuation in part of our copending application for Corner Clamp for Prefabricated Wall Forms, Serial No. 361,557, filed June 15, 1953.

What we claim as our invention is:

1. In a prefabricated wall form, an inside corner comprising a first panel having a wall forming surface on the inner side thereof, a second panel angularly disposed with respect to the first panel and also having a wall forming surface on the inner side thereof, a vertical corner member having a first wall abutting an end of the first panel and having a second wall forming a continuation of the wall forming surface of the first panel, said corner member also having a third wall forming a continuation of the wall forming surface of the second panel and having a portion overlying the latter surface, a corner clamp at the outer side of said panels comprising first and second relatively slidable parts having opposed clamping means respectively engageable with the first panel and member for clamping the first wall of said member firmly against the end of said first panel, means for relatively moving said parts, a third part supported on one of the first-mentioned parts for sliding movement into engagement with the outer side of the second panel in opposed relation to said overlying portion for clamping said second panel against said overlying portion, and means for sliding said third part relative to the first and second parts.

2. The structure defined in claim 1 wherein the means for relatively moving the first-mentioned parts comprises a wedge extending through registering slots therein, and wherein the means for sliding the third part comprises a wedge extending through registering slots in the third part and in the said one of the first mentioned parts.

3. In a prefabricated wall form, a panel having a wall forming surface on the inner side, a vertically extending corner forming, sheet metal column having a first wall abutting an end of said panel, said column having a second wall extending from an edge of the first wall and forming a continuation of the wall forming surface of said panel and a third wall contiguous with and extending at an angle to the second wall to provide a corner, and a corner clamp at the outer side of said panel for clamping said first wall firmly against the end of said panel, said corner clamp comprising relatively movable first and second parts having opposed clamping means respectively engageable with said column and said panel.

4. The structure defined in claim 3 comprising a second panel extending at an angle to the first panel and having a wall forming surface on the inner side in substantial continuation of said third wall, said third wall having a portion overlying the wall forming surface of said second panel, and a third part slidably mounted on one of the other parts for sliding movement into engagement with the outer side of said second panel in opposed relation to said overlying portion for clamping said second panel against said overlying portion, and means for sliding said third part relative to said first and second parts.

5. The structure defined in claim 4 wherein the third part is slidable in a direction extending parallel to the direction of sliding movement of the first and second parts.

6. In a prefabricated wall form, a corner comprising a first panel having a wall forming surface on the inner side thereof, a second panel angularly disposed with respect to the first panel and also having a wall forming surface on the inner side thereof, a vertical corner member having a first wall abutting the end of said first panel adjacent said second panel and having a second wall forming a continuation of the wall forming surface of the first panel, said corner member also having a third wall forming a substantial continuation of the wall forming surface of the second panel and having a portion overlying the latter surface, and clamping means comprising relatively movable first and second parts respectively engageable with said first panel and corner member for clamping the first wall of said corner member firmly against the end aforesaid of said first panel, said clamping means including a third part movable into engagement with the outer side of said second panel in opposed relation to said overlying portion for clamping said second panel against said overlying portion.

References Cited in the file of this patent

UNITED STATES PATENTS

| | | |
|---|---|---|
| 310,377 | Carrico | Jan. 6, 1885 |
| 830,893 | Engelhardt | Sept. 11, 1906 |
| 1,250,032 | Schub | Dec. 11, 1917 |
| 1,538,496 | Wells | May 19, 1925 |
| 1,552,334 | Mosher | Sept. 1, 1925 |
| 1,590,033 | Keffer | June 22, 1926 |
| 1,842,684 | Markham | Jan. 26, 1932 |
| 1,901,392 | Frederick | Mar. 14, 1933 |
| 2,017,553 | Troiel | Oct. 15, 1935 |
| 2,526,529 | Arrighini | Oct. 17, 1950 |